United States Patent [19]

Fetchin et al.

[11] 4,163,735
[45] Aug. 7, 1979

[54] CATALYST PREPARATION METHOD

[75] Inventors: John A. Fetchin; William F. Marzluff, both of Stamford, Conn.

[73] Assignee: American Cyanamid Company, Stamford, Conn.

[21] Appl. No.: 818,775

[22] Filed: Jul. 25, 1977

[51] Int. Cl.² .................... B01J 27/20; C01B 31/24; C01B 33/24

[52] U.S. Cl. .................... 252/443; 423/419 P; 423/331

[58] Field of Search .................... 423/419 P, 331; 252/443

[56] References Cited

U.S. PATENT DOCUMENTS

| | | | |
|---|---|---|---|
| 3,573,228 | 3/1971 | Holmes et al. | 423/331 X |
| 3,666,407 | 5/1972 | Orlemann | 423/331 |
| 3,911,090 | 10/1975 | Hem et al. | 423/419 P |
| 3,928,439 | 12/1975 | Dockner et al. | 260/557 R |
| 4,049,780 | 9/1977 | Neumann | 423/331 |

FOREIGN PATENT DOCUMENTS 29537 10/1930 Australia .................... 423/331

*Primary Examiner*—Delbert E. Gantz
*Assistant Examiner*—William G. Wright
*Attorney, Agent, or Firm*—Gordon L. Hart

[57] ABSTRACT

Copper-magnesium silicate-carbonate catalysts of improved activity and catalyst life for use in continuous hydration of acrylonitrile to acrylamide are prepared by a novel method in which magnesium and copper are precipitated separately in a common mother liquor and the precipitate is separated and dried at 170°–200° C. before pelleting. Pellets made from the dried powder, when reduced and calcined for use in the hydration reaction have better combination of catalytic properties than prior art catalysts of the type.

5 Claims, No Drawings

CATALYST PREPARATION METHOD

The invention relates to improvements in the catalytic hydration of nitriles to produce amides and more particularly to novel improvements of a preferred kind of catalyst that is useful for the catalytic hydration of acrylonitrile to produce acrylamide.

It is known that freshly reduced copper metal is an excellent catalyst for hydration of nitriles to produce amides. Watanabe described the hydration of nitriles using Urushibara copper to convert benzonitrile to benzamide. Copper metal catalysts were used by Greene & Godfrey in combination with copper salts to convert several nitriles to amides. Reduced copper catalysts prepared by reduction of copper from copper oxide or from copper chromium oxide were described by Habermann and Teffertiller for use in the catalytic hydration of acrylonitrile to produce acrylamide. A number of other copper metal catalysts made by different methods have been proposed for use in making acrylamide from acrylonitrile, such as Raney copper, Ullman copper, precipitated copper prepared by reduction of copper from a solution of copper salts using soluble reducing agents such as aldehydes or borohydrides, and the like. The several kinds of copper metal catalysts that have been proposed exhibit a variety of different catalytic activity characteristics. Though several of the best copper metal catalysts produce very high conversion of acrylonitrile to acrylamide with only very slight or no appreciable by-product, they are found to vary considerably from one to another with regard to the catalytic activity, i.e. the rate of conversion per unit of copper present, and with regard to the rate of decay of the catalytic activity over a period of continuous use in a continuous hydration process.

The particular class of copper catalysts to which the invention relates are the kind that have been described in the U.S. Pat. No. 3,928,439 and in the earlier German Pat. No. 869,052. Essentially, the active catalyst is copper metal prepared by reducing the copper compounds in copper-magnesium silicate or silicate-carbonate precipitated solids. Small proportions of promoter metal compounds may also be in the precipitated mixture, e.g. compounds of chromium or the like. This mixture, when reduced with hydrogen or other suitable reducing agent, provides catalytic copper metal with a supporting matrix of magnesium silicate. This catalyst is made by precipitation of insoluble metal compounds from aqueous solution of soluble salts of the metals. The precipitated solids are separated, dried and formed into pellets or other solid particulate forms suitable for use in a fixed bed catalytic reactor. The step of reducing copper compounds to copper in the catalyst preparation may be carried out in the same fixed bed reactor in which the catalyst pellets are to be used for the hydration reaction.

Catalysts of the class described have been found to catalyze the hydration reaction at very high rates of conversion based on the weight of copper in the catalyst. These catalysts are also characterized by exceptionally slow rate of decay of catalytic activity.

The present invention employs a novel method of making catalysts of the kind described and provides improved catalysts of the known type.

The known prior art methods for preparing catalysts of this type were those described in the U.S. Pat. No. 3,928,439 and in the German Pat. No. 869,052. In one of those methods a mixture of magnesium and copper silicates was precipitated in a single precipitation by addition of potassium silicate. In the other prior art method, separate magnesium silicate and copper carbonate precipitates were prepared in separate slurries which were combined to make a single slurry from which the mixed solids were separated and finished. In both preparations, the precipitates were dried at 40°–60° C. prior to pelleting.

In the present method, the first step is the precipitation of insoluble magnesium from solution of a soluble magnesium salt, by the addition of mixed alkali metal silicate and carbonate salts in aqueous solution. The resulting slurry of magnesium precipitate in its mother liquor, still contains enough unreacted silicate and carbonate in solution to precipitate the copper when added. Upon the addition of a soluble copper salt in aqueous solution to this slurry, copper is precipitated as insoluble copper compounds. The resulting mixed copper-magnesium silicate-carbonate solids mixture is separated from the liquid, e.g. by centrifuge or filtering, and the precipitated solids are prepared for catalytic use by washing, drying and pelleting steps. Unlike the prior art preparvtions, the precipitate is dried at drying temperatures in the range from 170° to about 200° C. before the pelleting step. The catalyst pellets must be activated by reducing with a suitable reducing agent, e.g. hydrogen diluted in nitrogen under reducing conditions, to prepare the catalyst for use in the hydration reaction. The reducing step is preferably deferred until just before the catalytic use is to begin, in order to avoid deactivation of the catalytic copper by oxidation of its freshly reduced copper metal surfaces.

The seemingly slight differences between the present method of making the catalyst and the prior art methods are found to produce an improved catalyst which produces results significantly superior to those obtained with the prior art catalysts of the same type when used for the catalytic hydration of acrylonitrile to produce acrylamide.

The rate of conversion obtained from a catalytic hydration reaction carried out in a continuous flow, fixed bed catalytic reactor under a given set of reaction conditions, i.e. same reaction temperature, same feed rate, same feed composition, etc., is a function of several factors relating to the catalyst, only one of which is the actual catalytic activity of the catalytic surfaces.

Some of the catalyst properties that influence the catalytic activity are physical properties which can be varied to some extent by the method of forming a given batch of dry precipitated solids into pellets. Two aspects of catalytic activity which can be so varied are the initial catalytic conversion rate which is a function of the porosity of the pellet and the rate of decline of the conversion rate which is a function, at least in part, of the catalyst pellet strength. When making a pellet by tableting a given batch of dry precipitated solids, the degree of compression for tableting is selected which will produce pellets having a desired initial activity which is consistent with adequate structural strength of the pellets. Increasing the tableting compression, within a practical range, will tend to increase the pellet strength but will tend to decrease the porosity, hence decrease the initial conversion rate of the catalyst when used in the hydration reactor. Since the catalyst life depends at least in part upon adequate structural strength of the pellets, the best catalyst will combine adequate strength with high initial activity when made into pellets.

The invention employs an improved copper-magnesium precipitate which can be made into pellets which will have more structural strength than a prior art catalyst of the same type which produced an equivalent initial conversion rate in the hydration reaction. It can be stated conversely, that pellets of the catalyst having a given structural strength will produce an initial conversion rate which is higher than that obtained using prior art catalysts of the same strength.

To demonstrate the advantages of the invention by comparison with prior art catalysts of the same kind, two comparision catalysts are used; these are the two best prior art catalysts of this kind known to us. Both of the prior art comparison catalysts were obtained commercially. We do not know what methods were used in making these comparison catalysts. We suppose they were made by methods similar to those described in the German Pat. No. 869,052. These two comparison catalysts were obtained from BASF under the respective tradenames BASF Catalyst R3-11 and BASF Catalyst V-1170.

For the purpose of comparing pellets made from an improved catalyst precipitate of the present invention, the precipitate prepared by the novel method is made into test pellets which produce initial conversions at a conversion rate significantly higher than that of the prior art R3-11 catalyst, under comparable reaction conditions. The structural strength of test pellets made with the new precipitate is greater than the strength of the prior art R3-11 pellets. The other comparison catalyst, V-1170, will produce acrylamide at a substantially lower initial conversion rate than the R3-11 catalyst but the V-1170 catalyst has higher measured structural strength than R3-11, hence longer catalyst life. Strength of the V-1170 comparison catalyst is roughly near the strength of test pellets made from the new catalyst precipitate.

In the use of catalyst beds made with prior art catalysts, particularly with the R3-11 catalyst, some gradual decline of conversion rate in the hydration reaction is observed over long periods of use. This decline is attributed in part to inherent decay of catalytic activity at the catalytic surfaces, but the rates of decline of the conversion rates have been found to correlate inversely with measured structural strengths of the several catalyst pellets. This suggests that the gradual loss of conversion is due at least to gradual disintegration of pellets in the bed. Beds made with stronger catalyst are found to experience lower rates of decline of conversion rate. Catalyst beds made of the present catalyst are found to undergo a rate of decline of the conversion rate which is as good as or better than those obtained with any of the prior art catalysts of the same kind available, under comparable conditions of use.

EXAMPLE 1

Making the Catalyst

To prepare about 500 grams of dried catalyst powder for pelleting, three separate solutions are prepared as follows:

Solution I.

In two liters of deionized water dissolve
600 gm (2.48 moles) $Cu(NO_3)_2 \cdot 3H_2O$
13.3 gm (0.030 moles) $Cr(NO_3)_3 \cdot 9H_2O$
Add conc. $HNO_3$ dropwise until pH of the solution remains at pH 3.0 for about 5 min. This converts any insoluble basic copper nitrate salt to the soluble salt. Use of excessive acid in this solution may cause unwanted copper oxide in the precipitate, which can cause rapid catalyst decay when the catalyst is used for the hydration reaction.

Solution II.

In two liters deionized water dissolve
574 gm (2.24 moles) $Mg(NO_3)_2 \cdot 6H_2O$ Solution III.

In three liters of deionized water, while stirring, dissolve
302 gm (2.47 moles) $Na_2SiO_3$
240 gm (2.26 moles) $Na_2CO_3$
A hazy solution may result as the temperature rises to about 35° C. during dissolution. This cloudy solution may be used without the need for clearing or cooling the solution. The precipitations are carried out at 30°–40° C.

While rapidly agitating Solution II, the Solution III is slowly added over a period of about 20 minutes. To the resulting slurry, and with continued efficient stirring, Solution I is added over an 8–10 minute period. Stirring is continued for one hour. The resulting slurry is separated from the mother liquor by filtration (No. 1 Whatman paper); the filter cake is washed with deionized water (6 liters water on Buchner funnels with suction). The cake is reslurried in 5 liters of deionized water and five grams of minus 325 mesh graphite flakes are added as a lubricant for the pelleting step. The second slurry is stirred for one hour, filtered and washed again as before, and the filter cake is oven-dried at 175° C. for 1 to 2 days. The slurry may be spray dried to remove the bulk of the water before the described oven drying. It is found that drying the filtered solids at temperatures above 170° C. but not over about 200° C. before pelleting will improve the pellet strength. The oven-dried cake is powdered by grinding to make a powder having density about 61 gm/100 cc. The second slurry operation can be omitted entirely if desired, in which case the graphite is added at the end of the Solution I addition.

The dry powder is dull green in color. Pellets are pressed from the powder, using a Stokes Model D4 rotary tablet machine. Tablets prepared as described will vary in properties. Typical average values are 4.8 mm in diameter, 2.9 mm high. The tablets are compressed to pellet density about 1.49 gm/cc. Bulk density of dry tablets in a container is about 90 gm/100 cc. Pore volume is 0.33 cc/gm as measured with toluene. Surface area is $290 \pm 8$ $M^2/gm$. Dry crush strength before reducing the copper is about $224 \pm 58$ lb/in. The composition is described in Table 1.

The catalyst prepared by the method of Example 1 is evaluated in an actual continuous catalytic hydration process by comparison with two different commercially obtained catalysts of the same general type described before. Compositions of those catalysts are also shown in Table 1. In Table I a range of measured values from several samples is reported for R3-11 and the test catalyst. The R3-11 catalyst is the conventional, most widely used prior art catalyst of this type, and the V-1170 catalyst is a modification of the same type, which has been prepared by the manufacturer specifically for use in the catalytic acrylonitrile hydration process. The V-1170 catalyst differs essentially from the R3-11 catalyst by the incorporation of some graphite and by the elimination of barium from the catalyst formulation.

The crush strength of these catalyst pellets is a rough indication of their ability to resist disintegration under the rigors of the catalytic use in the catalytic hydration reaction. The most significant strength measurement is wet crush strength, which is measured after the catalyst has been reduced, calcined and washed for 48 hours in warm water.

The reactor is charged with particles of the unreduced catalyst and the copper is reduced by flowing a reducing mixture of hydrogen diluted in nitrogen through the bed at reducing temperature, in the range about 175° to 200° C. until reduction is complete. The catalyst is then calcined at 300° to 400° C. for 15 to 48 hours to strengthen the catalyst. For the test we calcined 325° C. for 48 hours in a stream of nitrogen. To avoid oxidation of the already reduced copper during calcining, one may wish to add about 1% hydrogen to scavenge dry oxygen in the hot nitrogen stream. The catalyst is then washed continuously with deaereated water for 48 hours at 75° C. A continuous flow of aqueous acrylonitrile solution is fed continuously through the catalytic reactors for carrying out the hydration reaction at 80° C. On actual comparative testing in reactors, the catalyst of the invention is found to produce at an initial conversion rate better than R3-11 and to have an improved decay rate which is as good as or better than those of the prior art catalysts, i.e. better than R3-11 and as good as the modified catalyst V-1170.

EXAMPLE 2

Comparative Testing of the Catalyst of the Invention

The three catalysts tested are of practically equivalent elemental compositions with the slight exceptions noted above. Three identical, laboratory-size, upright cylindrical fixed-bed hydration reactors are loaded, each with a different one of the two comparison catalysts and the test catalyst, i.e. BASF R3-11, the modified catalyst V-1170 and a catalyst prepared as described in Example 1. All three catalysts are reduced calcined and washed in the reactor as described above.

A saturated aqueous solution of acrylonitrile (about 7% acrylonitrile in deionized deaerated water) is fed continuously through each reactor at a feed temperature of 80° C. The flow of the reactant solution through the beds is vertical from top to bottom. The feed rate is monitored to maintain percent conversion per pass constant at 60%. The product compositions taken from the reactors are monitored by periodic sampling and chemical analysis. From the operating and analytical data collected in the operation of each test reactor, an initial conversion rate is determined. Periodically during the continuous reaction, a sample is drawn from the reactor effluent and the catalytic activity value at the time that sample was drawn is calculated from the operating data and results of the analysis. The measured catalytic activity value can be expressed in terms of the weight of acrylamide produced per hour per weight unit of catalyst at the constant operating conditions. The rate of decline of the catalytic activity values measured throughout the course of the continuous process indicates a catalytic activity decay rate for the catalyst. The decay rate may be expressed indirectly in terms of total hours of continuous running until the activity has declined to one-half of the initial activity. We call this value t-$\frac{1}{2}$.

Results obtained with the three catalysts during extended continuous running under the conditions described are tabulated in Table II. In that table, for some of the catalyst, a range of results is reported. These were the ranges of variation obtained in more than one reactor run of the kind described using different batches of the same catalyst. Additional test catalysts, shown separately on the last line, were made by the method described scaled-up for making large batches. The surface areas are reported to show similarity of the several catalysts with regard to contact area in the pellets. Crush strength was measured by a standard method using a group of pellets taken from the reactor after the catalyst had been reduced and calcined as described above and washed in warm water (75° C.) circulated through the bed for 48 hours. The initial conversion rate was calculated as described above and the rate of decline of the conversion rate is reported as t-$\frac{1}{2}$, i.e. the hours continuous running under the stated conditions that would have reduced the conversion rate to $\frac{1}{2}$ the initial activity. When t-$\frac{1}{2}$ exceeded 10,000 hours, it was reported as >10,000 hours.

For the precipitation of magnesium, the amount of magnesium added is considerably in excess of the amount that can be precipitated. Addition of more soluble magnesium without other additions would not substantially increase the amount of magnesium in the finished catalyst. On the other hand, the amount of copper precipitated accounts for all but a small proportion of the amount of soluble copper added. The relative proportions of magnesium and copper in the starting solutions will not be the same as the proportions of those metals in the precipitate or the finished catalyst. The precipitating anions, silicate and carbonate, should be present in slight excess of the amounts needed to precipitate all of the magnesium added as silicate and to precipitate all of the copper added as cupric carbonate, but the composition of the precipitated solids will not be so simple. Most of the magnesium in the solids is present as silicate but the copper in the solids appears to be present as a complex resembling malachite. The ratio of copper to magnesium in the precipitated solids can be varied by varying the amount of copper added. The amount of chromium can be any promoting amount, usually less than one percent by weight. To make catalysts that are effective for the purpose of the invention the weight ratio of copper to magnesium in the finished catalyst should be in the range from about 3 to about 5 parts copper per part Mg.

TABLE I

| | Catalyst Analysis Before Reducing Copper | | |
|---|---|---|---|
| | CATALYST | | |
| Compound | R3-11 wt % | V1170 wt % | Test wt % |
| Cu | 26.5–29.2 | 29.6 | 28.5–31.6 |
| Mg | 6.9–8.6 | 8.8 | 7.6– 9.2 |
| Cr | 0.52–0.84 | 0.71 | 0.29–0.41 |
| Ba | 0.54–0.89 | — | — |
| SiO$_2$ | 26.2–28.8 | 27.5 | 23.5–25.5 |
| CO$_2$ | 4.5–6.0 | 4.2 | 5.7–8.0 |

Notes: Remainder is water, graphite (in V-1170 and Test only), hydroxide, the extra oxygen in carbonates and silicates, and impurities. Silicate and carbonate are measured as the oxides of silica and carbon.

TABLE II

| Catalyst | Surface Area M²/g | Crush Strength lbs/in | Initial Conversion rate g.AMD/g. | t-½ Hrs |
|---|---|---|---|---|
| R3-11 Range | 270–290 | ×–42 | 0.19–0.23 | 6000–8000 |
| V 1170 | 268 | 46 | 0.18 | >10000 |
| Test | 290 | 58 | 0.26 | >10000 |
| Test (large scale) | 264–303 | 42–88 | 0.25–0.30 | >10000 |

We claim:

1. A process for the preparation of copper-magnesium silicate-carbonate catalyst containing about three to five parts by wt copper per part magnesium for the hydration reaction of a nitrile with water comprising:
    A. Preparing a precipitate of insoluble carbonates and silicates of magnesium and copper by addition of soluble magnesium and copper salts in aqueous solution to soluble silicate and carbonate compounds in aqueous solution,
    B. Separating the precipitated solids from the mother liquor, drying the filtered solids at drying temperatures in the range from 170° to 200° C., and powdering the dry solids,
    C. Tableting the dry powdered solids with added tableting lubricants to make the powder into catalyst pellets, and
    D. Activating the catalyst pellets by reducing copper compounds therein to copper metal and calcining at 300° C. to 400° C. to strengthen the catalyst.

2. A process for the preparation of copper-magnesium silicate-carbonate catalyst containing about three to five parts by wt copper per part magnesium for the hydration reaction of a nitrile with water comprising:
    A. Precipitating insoluble silicate and carbonate of magnesium from an aqueous solution of soluble magnesium salt by addition to aqueous solution of excess soluble silicate and excess soluble carbonate compounds and, when said precipitation is complete, precipitating insoluble silicate and carbonate of copper by addition of soluble copper salt in aqueous solutions to the same solution in which the magnesium has been precipitated and, when the precipitation of copper is complete,
    B. Separating the precipitated solids from the mother liquor, drying the filtered solids at drying temperatures in the range from 170° to 200° C., and powdering the dry solids,
    C. Tableting the dry powdered solids with added tableting lubricants to make the powder into catalyst pellets, and
    D. Activating the catalyst pellets by reducing copper compounds therein to copper metal and calcining at 300° C. to 400° C. to strengthen the catalyst.

3. Hydration catalyst made by the process defined by claim 1.

4. A method defined by claim 1 wherein a promoting amount of chromium is precipitated with the copper by addition of soluble chromium salt in the defined solution of soluble copper salt.

5. A method defined by claim 1 wherein the defined tableting lubricant is graphite.